UNITED STATES PATENT OFFICE.

ROBERT R. ROBERTS, OF BONHAM, TEXAS.

IMPROVEMENT IN MEDICAL COMPOUNDS.

Specification forming part of Letters Patent No. 149,679, dated April 14, 1874; application filed October 11, 1873.

CASE B.

*To all whom it may concern:*

Be it known that I, Dr. ROBERT R. ROBERTS, of Bonham, in the county of Fannin and State of Texas, have invented a new and useful Improvement in Medical Compound, of which the following is a specification:

This invention or discovery relates to the curative art; and consists in a compound composed of the ingredients hereinafter described, the compound being preferably prepared for use in the form of three-grain sugar-coated pills.

In carrying out my invention, I proceed as follows to form the mass from which the pills are made, so that each pill will contain, of podophyllin, one-half grain; leptandrin, one-half grain; extract of rhubarb, one-half grain; extract of jalap, one-half grain; extract of butternut-bark, one grain—thus making a three-grain cathartic pill.

The mass is mixed with the proper quantity of gum-arabic and water or other liquid, to give it the necessary adhesiveness, the whole being thoroughly worked and mixed together, when it is divided into pills in the pill-machine, each pill, as before stated, containing about three grains; but I do not confine myself to any particular-sized pill, nor to the exact proportions of the ingredients named.

These pills may be used either with or without being coated with sugar; but I prefer to prepare them sugar-coated, and pursue any of the well-known processes for that purpose.

These pills are employed for the cure of various diseases, more especially those which affect the bowels and digestive organs.

Having thus described my invention, I claim as new and desire to secure by Letters Patent—

The within-described compound, substantially as set forth.

ROBERT R. ROBERTS, M. D.

Witnesses:
    SETH W. GOULD,
    ROBT. DUNCAN.